Patented Mar. 25, 1941

2,236,061

UNITED STATES PATENT OFFICE 2,236,061

METHOD OF MAKING FILMS, THREADS, AND THE LIKE

Emmette F. Izard, Kenmore, and Earl J. Kohn, East Aurora, N. Y., assignors to E. I. du Pont de Nemours & Company, Wilmington, Del., a corporation of Delaware No Drawing. Application May 27, 1937, Serial No. 145,118

16 Claims. (Cl. 18—54)

This invention relates to a process of producing films, filaments, threads, cords, bristles, ribbons, tubings, bands, caps, and similar shaped articles. More particularly, it relates to a process for forming such articles from polyvinyl alcohol.

It is well known that polyvinyl alcohol may be precipitated from solution in water by extruding the aqueous solution into an organic, water miscible solvent, such as acetone or alcohol. In carrying out such a procedure, however, the coagulated films or threads seem always to be very cloudy and usually quite brittle and, therefore, useless. It is also known to convert the solution into such articles by evaporating the solvent water. This procedure takes a relatively long period of time.

It is therefore an object of the present invention to convert aqueous solutions of polyvinyl alcohol into threads, films, and similar products which are substantially transparent.

Another object of the present invention is to provide an aqueous coagulating bath whereby an aqueous solution of polyvinyl alcohol may be continuously converted into threads or films and wound up at relatively high rates of speed.

A further object is to coagulate aqueous solutions of polyvinyl alcohol without changing the chemical structure of the polyvinyl alcohol or rendering it insoluble in hot water.

The objects of the present invention are accomplished in general by coagulating an aqueous solution of polyvinyl alcohol in a coagulating bath comprising a preferably colorless, inorganic salt dissolved in water, said salt having substantially no oxidizing action. By the term "inorganic salt" is meant the salt of an inorganic base with an inorganic or low molecular weight organic acid, such as those containing less than eight carbon atoms.

For the coagulating bath in accordance with this invention there may be utilized solutions of various inorganic salts, of which ammonium sulfate is preferred. Among others may be mentioned strong aqueous solutions of sodium bicarbonate or sodium carbonate, saturated aqueous solutions of sodium chloride, potassium chloride, magnesium chloride, calcium chloride, alum, sodium sulfate, sodium bisulfate, aluminum sulfate, zinc chloride, zinc acetate, zinc sulfate, sodium acetate, sodium phosphate, sodium citrate, magnesium citrate, sodium tartrate, ammonium chloride, magnesium sulfate, sodium potassium tartrate, etc. There may, if desired, be present other materials, such as acids or bases.

For example, baths containing sodium sulfate and sulfuric acid, ordinarily used in the coagulation and regeneration of viscose, have been found suitable to a certain extent.

The use of salts having a substantial degree of oxidizing effect is to be avoided, since such treatment causes the polyvinyl alcohol to become water insoluble. Although in some cases water insolubility, as hereinafter pointed out, is desired, it is preferred to effect this uniformly by means other than the use of an oxidizing salt, at a later stage.

When films are prepared from polyvinyl alcohol, the highest degree of transparency is usually desired. For this purpose the polyvinyl alcohol solution is preferably preliminarily coagulated in a concentrated aqueous solution of a strong base, such as sodium hydroxide, or potassium hydroxide. The coagulation is completed, before treating with pure water for washing purposes, by means of an aqueous solution of ammonium sulfate or other inorganic salt. The completely coagulated film is washed with water. After drying with a warm current of air, the polyvinyl alcohol film is perfectly clear and transparent and is still soluble in hot water.

The concentration of the coagulating bath may be any convenient value sufficient to accomplish the purpose, up to saturated solutions, depending upon the particular salt employed. Conveniently, concentrations of at least 15% are used. In the case of preliminarily coagulating with solutions of strong bases, it is possible to employ still lower concentrations of inorganic salts, such as 10%, or even 5%. It is preferred, however, to use a concentrated, such as a saturated, solution in order to obtain a rapid coagulation which in turn means that a higher rate of production is possible. In casting the solution from a hopper, it also enables the resulting film to become self-supporting within a comparatively short space of time.

The temperature at which coagulation is carried out is likewise any convenient value sufficient to accomplish the purpose and not so high as to cause decomposition or other undesired chemical action. Conveniently, temperatures between 40° and 50° C. are employed although lower temperatures, such as room temperature, may be used. Generally, however, it is preferred to operate at a temperature higher than 40° C. rather than lower inasmuch as coagulation occurs at a more rapid rate.

Any desired type of polyvinyl alcohol of any convenient viscosity may be employed in the practice of this invention. Polyvinyl alcohol is generally prepared by hydrolysis of polyvinyl acetate, and either completely hydrolyzed or partly hydrolyzed products may be used. If only partly hydrolyzed products are used, the quantity of unsaponified ester and/or acetal type groups must be small enough so that the products will still be soluble in hot water. Substituted polyvinyl alcohols, such as polymethylvinyl alcohol, may also be used. The concentration of the polyvinyl alcohol solution may be any convenient value, and is preferably around 15%.

The invention is applicable to polyvinyl alcohol alone or polyvinyl alcohol modified with other materials, particularly water soluble or aqueous acid soluble materials. Preferred materials of this type are amino polymers insoluble in water and in 5% aqueous ammonia but soluble in 2% aqueous acetic acid and in which the amino nitrogen may be primary, secondary or tertiary or part of an open chain or of a cyclic molecular structure, such as deacetylated chitin, diethylaminoethyl methacrylate polymer, morpholine N-ethyl methacrylate polymer, an interpolymer of dicyclohexylaminoethyl methacrylate and methyl vinyl ketone, triethanolamine monomethacrylate polymer, dimethylaminomethyl zein, and piperidylmethyl zein. These materials are coprecipitated, in accordance with this invention, with the polyvinyl alcohol. Polyvinyl alcohol compositions containing basic soluble materials, such as rosin, rosinates or modified rosin, may also under proper conditions be coagulated according to this invention.

The invention likewise is applicable to polyvinyl alcohol compositions which can be subsequently made insoluble in water and all common solvents by means of heat. Examples of such polyvinyl alcohol compositions are those containing polyhalogenated compounds, such as dichlorodioxane, dimethylolurea, or polybasic acids, particularly polymethacrylic acid. The coagulated products containing such materials may, for example, be rendered water insoluble by heating at approximately 110° C. for a period varying from about 30 minutes to 3 hours. The method comprising forming films, threads and the like from such compositions and then rendering them insoluble in water and all common solvents by means of heat is not part of the present invention but is described and claimed in U. S. Patent No. 2,169,250 (Izard).

The following examples are given to illustrate the application of the invention, but they are in no wise to be considered limitative.

*Example I*

A 16.7% solution of polyvinyl alcohol in water is poured in the form of a film on a glass plate and placed in a bath which consists of an 18% solution of ammonium sulfate in water and which is maintained at room temperature. After a period of one minute, the polyvinyl alcohol film is completely coagulated and can be stripped in the usual manner from the plate. The film is washed substantially free of any coagulating solution with cold water or other suitable liquids and dried with a warm current of air to give a tough, substantially transparent sheet, which is still soluble in hot water.

If the procedure is conducted with the coagulating bath at a temperature of 43° C. instead of room temperature, the results are substantially identical except that the film is completely coagulated after a period of half a minute.

*Example II*

A mixture consisting of 30 parts of polyvinyl alcohol, 10 parts of water soluble dimethylolurea resin, and 200 parts of water is spun through a multiple hole spinneret into a coagulating bath consisting of a 35% solution of ammonium sulfate in water which is maintained at a temperature of 40-50° C. After a travel of 24 inches, the coagulated filaments are withdrawn from the bath at a rate of about 120 feet per minute, washed free of coagulating solution with cold water or other suitable liquids, dried in a current of warm air, and wound on a bobbin. Alternatively, the freshly coagulated threads may be immediately collected in a centrifugal bucket and subsequently washed and dried.

The filaments are still soluble in hot water.

*Example III*

The same procedure is followed as in Example II, except that 10 parts of methacrylic acid monomer and 0.5 part of benzoyl peroxide are substituted for the water soluble dimethylolurea resin. Before spinning, this composition is heated at 90° C. for five hours, then at 75-80° C. for sixteen hours to effect polymerization of the methacrylic acid. After filtration, the solution is heated to 75° C. and spun from a multiple hole spinneret directly into an aqueous 35% solution of ammonium sulfate maintained at a temperature of 45-50° C.

The washed and dried filaments are still soluble in hot water.

*Example IV*

A 15% solution of polyvinyl alcohol and water containing a trace, such as 0.2%, of a wetting agent, such as a water soluble sulfonation product of a higher aliphatic alcohol is made into preformed caps by the following procedure: The closed end of a glass tube is dipped into the aqueous polyvinyl alcohol solution, the excess solution allowed to drain, and the tube inverted and turned until a smoth film is formed. The whole tube is then dipped into a bath comprising a 30% solution of sodium hydroxide in water. After a period of one minute, the cap thus formed is removed from the tube and immersed in a 10% solution of ammonium sulfate for a period of one minute and finally washed with cold water to give a clear, perfectly transparent cap which is still soluble in hot water. When placed over a bottle, this wet cap shrinks sufficiently during drying to yield a snug fit around the uneven contours of the bottle neck.

*Example V*

A mixture consisting of 7.5 parts of deacetylated chitin, 3.8 parts of acetic acid and 45 parts of polyvinyl alcohol is dissolved in 314 parts of water, filtered, and spun directly into a bath consisting of a 35% solution of ammonium sulfate in water and which is maintained at a temperature of 40-50° C. The resulting modified polyvinyl alcohol filaments are collected as in Example II. They possess very satisfactory physical properties and are still soluble in hot water.

*Example VI*

A solution containing 60 parts of polyvinyl alcohol and 0.12 part of the sodium salt of isopropyl naphthalene sulfonic acid in 340 parts of water is cast on a glass plate and immersed immediately in a 40% sodium hydroxide bath. After a period of two minutes, the film is removed and placed in a 10% ammonium sulfate bath for one minute and then washed in two circulating baths at room temperature, and finally impregnated in a 4% glycerin bath and dried on a frame at 85° C. All of the above baths are maintained substantially at room temperature.

In the spinning of threads it is preferred that the spinning nozzle be immersed in the coagulating bath. In some cases, however, it may be advantageous to position the spinning nozzle somewhat out of and above the coagulating bath in order that the threads may pass through a short air gap before contacting the coagulating liquid.

For convenience sake, the above examples relating to film are applied to film produced by a process consisting of extruding the polyvinyl alcohol solution on to a glass plate, immersing the plate in a coagulating bath, stripping the coagulated film from the glass plate, washing the film, and drying. However, by means of the coagulating bath of the present invention, polyvinyl alcohol film may be cast continuously by a process consisting of extruding the solution from a hopper into the coagulating bath, passing the coagulated film first through a wash bath and second over rollers heated to a suitable temperature, and winding the dry film upon a mandrel. Alternately, the coagulated and washed film may be dried by passage in a festoon arrangement over suitable guide rollers maintained in a warm evaporated medium.

The invention is applicable to the formation of threads, films, preformed caps, tapes, ribbons, cords, bristles, sausage casings, and many other articles.

The wet spinning of the present invention has a distinct advantage over dry spinning an aqueous solution of polyvinyl alcohol in that the water of the solution is removed from the shaped article fairly rapidly. Possibly this is due to the fact that water is a comparatively high boiling solvent of low molecular weight so that rather large quantities of heat, conveyed by means of an air stream or other inefficient means of heat transfer, are required for removal of water in dry spinning. Compared to the spinning of a polyvinyl alcohol solution into an organic, water miscible solvent, such as acetone or alcohol, the coagulated films and fibers secured by the invention possess satisfactory physical properties and in addition are relatively or completely transparent, depending on the salt or base used in the coagulating bath. Films and fibers obtained by the invention are apparently perfectly continuous. Of considerable importance is the fact that the invention permits the production of articles of polyvinyl alcohol or modified polyvinyl alcohol compositions at a comparatively high rate with equipment essentially the same as that employed by industry in the production of viscose rayon and regenerated cellulose film.

Any variation or modification of the invention as described above which conforms to the spirit of the invention is intended to be included within the scope of the claims.

We claim:

1. In a process for the manufacture of polyvinyl alcohol articles, the step comprising coagulating an aqueous solution of polyvinyl alcohol in an aqueous solution of inorganic salt having substantially no oxidizing action, the concentration of the inorganic salt aqueous bath being sufficient to effect coagulation in the desired time.

2. In a process for the manufacture of polyvinyl alcohol articles, the step comprising coagulating an aqueous solution of polyvinyl alcohol in an aqueous bath containing at least 15% of dissolved inorganic salt having substantially no oxidizing action.

3. In a process for the manufacture of polyvinyl alcohol articles, the step comprising coagulating an aqueous solution of polyvinyl alcohol in an aqueous bath containing ammonium sulfate, the concentration of the ammonium sulfate bath being sufficient to effect coagulation in the desired time.

4. In a process for the manufacture of polyvinyl alcohol articles, the step comprising partially coagulating an aqueous solution of polyvinyl alcohol in an aqueous bath containing 30% sodium hydroxide, removing the polyvinyl alcohol material after partial coagulation and finishing the coagulation by immersion in aqueous 10% ammonium sulfate.

5. In a process for the manufacture of polyvinyl alcohol articles, the step comprising coagulating an aqueous solution of polyvinyl alcohol in an aqueous bath containing at least 35% ammonium sulfate.

6. In a process for the manufacture of polyvinyl alcohol articles, the steps comprising coagulating an aqueous solution of polyvinyl alcohol in an aqueous solution of inorganic base and completing the coagulation in an aqueous solution of inorganic salt having substantially no oxidizing action, the concentration of the inorganic salt coagulating bath being sufficient to effect coagulation in the desired time.

7. In a process for the manufacture of polyvinyl alcohol articles, the steps comprising coagulating an aqueous solution of polyvinyl alcohol in an aqueous solution of alkali metal hydroxide and completing the coagulation in an aqueous solution of inorganic salt having substantially no oxidizing action, the concentration of the inorganic salt coagulating bath being sufficient to effect coagulation in the desired time.

8. In a process for the manufacture of polyvinyl alcohol articles, the steps comprising coagulating an aqueous solution of polyvinyl alcohol in an aqueous bath containing sodium hydroxide and completing the coagulation in an aqueous bath containing at least 10% ammonium sulfate.

9. A process of converting aqueous polyvinyl alcohol solution into transparent shaped products, which comprises shaping the polyvinyl alcohol solution into the desired form, and thereafter immersing the shaped material in a coagulating bath consisting of an aqueous solution of an inorganic salt having substantially no oxidizing action, the concentration of the said coagulating solution being sufficient to effect coagulation in the desired time, and removing the coagulated polyvinyl alcohol product from the coagulating bath.

10. A process of converting aqueous polyvinyl alcohol solution into transparent shaped products, which comprises shaping the polyvinyl alcohol solution into the desired form, and thereafter immersing the shaped product containing polyvinyl alcohol solution in a coagulating aqueous saturated solution of an inorganic salt having substantially no oxidizing action, and removing the coagulated polyvinyl alcohol product from the coagulating bath.

11. A process of converting aqueous polyvinyl alcohol solution into transparent shaped products, which comprises shaping the polyvinyl alcohol solution into the desired form, and thereafter treating the shaped product containing polyvinyl alcohol solution with an aqueous coagulating solution of an inorganic salt having substantially no oxidizing action until coagulation is complete, the concentration of the coagulating solution being sufficient to effect coagulation in the desired time.

12. In a process in which shaped aqueous solutions of polyvinyl alcohol are progressively coagulated, the step of carrying out the final stages of the coagulation in an aqueous solution of inorganic salt having substantially no oxidizing action by submerging the shaped material in the said bath and removing it after the coagulation is finished, the concentration of the said coagulating bath being sufficient to effect coagulation in the desired time.

13. A process of converting aqueous polyvinyl alcohol solution into transparent shaped products, which comprises shaping the polyvinyl alcohol solution into the desired form, and thereafter submerging in an aqueous solution of inorganic salt having substantially no oxidizing action, the material being maintained submerged therein during the final stages of coagulation and then being removed therefrom, the concentration of the said aqueous inorganic salt bath being sufficient to effect coagulation in the desired time.

14. A process of converting aqueous polyvinyl alcohol solution into transparent shaped products, which comprises shaping the polyvinyl alcohol solution into the desired form, treating the shaped solution with an aqueous solution of an alkali metal hydroxide to partially coagulate the same, and thereafter treating the partially coagulated material with an aqueous solution of inorganic salt from the group consisting of ammonium chloride, sodium chloride, potassium chloride, calcium chloride, magnesium chloride, zinc chloride, ammonium sulfate, sodium sulfate, magnesium sulfate, aluminum sulfate, sodium bisulfate, sodium carbonate, sodium bicarbonate and sodium phosphate, until coagulation is finished, the concentration of the inorganic salt coagulating solution being sufficient to effect coagulation in the desired time, and being at least 5%.

15. In a process for the manufacture of polyvinyl alcohol articles in which an aqueous solution of polyvinyl alcohol is progressively coagulated in water solution having substantially no oxidizing action without rendering the polyvinyl alcohol insoluble in hot water, the step comprising finishing coagulation of the polyvinyl alcohol in an aqueous bath containing at least 5% of dissolved inorganic salt having substantially no oxidizing action.

16. In a process for the manufacture of polyvinyl alcohol articles soluble in hot water, comprising immersing a shaped aqueous solution of polyvinyl alcohol in one or more aqueous coagulating baths which do not have a substantial degree of oxidizing effect until coagulation of the polyvinyl alcohol is completed, the coagulating bath in which the coagulation is finished containing at least 5% of dissolved inorganic salt having substantially no oxidizing action.

EMMETTE F. IZARD.
EARL J. KOHN.